United States Patent
Hoshino et al.

(10) Patent No.: US 10,149,254 B2
(45) Date of Patent: Dec. 4, 2018

(54) TERMINAL, BASE STATION, TRANSMISSION POWER CONTROL METHOD, AND TRANSMISSION POWER SETTING METHOD

(71) Applicant: Panasonic Intellectual Property Corporation of America, Torrance, CA (US)

(72) Inventors: Masayuki Hoshino, Kanagawa (JP); Lilei Wang, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 30 days.

(21) Appl. No.: 15/326,008

(22) PCT Filed: Aug. 1, 2014

(86) PCT No.: PCT/CN2014/083529
§ 371 (c)(1),
(2) Date: Jan. 12, 2017

(87) PCT Pub. No.: WO2016/015327
PCT Pub. Date: Feb. 4, 2016

(65) Prior Publication Data
US 2017/0208554 A1 Jul. 20, 2017

(51) Int. Cl.
*H04W 52/24* (2009.01)
*H04W 52/14* (2009.01)
(Continued)

(52) U.S. Cl.
CPC ....... *H04W 52/247* (2013.01); *H04W 52/146* (2013.01); *H04W 52/248* (2013.01);
(Continued)

(58) Field of Classification Search
CPC ............. H04W 52/146; H04W 52/247; H04W 52/248; H04W 52/262; H04W 52/362; H04W 52/383; H04W 88/08
(Continued)

(56) References Cited

U.S. PATENT DOCUMENTS 9,838,975 B2 * 12/2017 Chae ...................... H04W 52/18
2008/0069039 A1 * 3/2008 Li ........................... H04W 36/02
370/329

(Continued)

FOREIGN PATENT DOCUMENTS

WO 2013/134950 A1 9/2013
WO 2013/137580 A1 9/2013

OTHER PUBLICATIONS

3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.
(Continued)

*Primary Examiner* — Robert J Lopata
(74) *Attorney, Agent, or Firm* — Seed IP Law Group LLP

(57) ABSTRACT

Disclosed is a terminal that performs an appropriate transmission power control for both signals intended for a base station and for D2D communication. The terminal includes: a reception processing section that receives a control signal including a TPC command selected from among a plurality of candidate values; and a transmission power control section that controls a first transmission power for an uplink data signal for a base station, using a first correction value corresponding to the received TPC command, and that controls a second transmission power for a signal for D2D communication using the first correction value or a second correction value corresponding to the received TPC command. In the terminal, the first and the second correction
(Continued)

values are set for each candidate value of the TPC command; and the second correction value is set lower than the first correction value for at least one of the candidate values.

10 Claims, 11 Drawing Sheets

(51) Int. Cl.
 *H04W 52/26* (2009.01)
 *H04W 52/36* (2009.01)
 *H04W 52/38* (2009.01)
 *H04W 88/08* (2009.01)
(52) U.S. Cl.
 CPC ....... *H04W 52/262* (2013.01); *H04W 52/362* (2013.01); *H04W 52/383* (2013.01); *H04W 88/08* (2013.01)
(58) Field of Classification Search
 USPC .......................................................... 370/328
 See application file for complete search history.

(56) References Cited

U.S. PATENT DOCUMENTS

| | | | | |
|---|---|---|---|---|
| 2008/0069062 A1* | 3/2008 | Li | .................. | H04W 52/265 370/338 |
| 2008/0069063 A1* | 3/2008 | Li | .................. | H04W 88/06 370/338 |
| 2009/0010185 A1* | 1/2009 | Li | .................. | H04W 52/383 370/280 |
| 2013/0230032 A1* | 9/2013 | Lu | .................. | H04W 72/02 370/336 |
| 2014/0094213 A1 | 4/2014 | Khoshnevis et al. | | |
| 2014/0169322 A1* | 6/2014 | Ouchi | .............. | H04W 52/146 370/329 |
| 2014/0378150 A1 | 12/2014 | Li et al. | | |
| 2015/0078270 A1 | 3/2015 | Seo et al. | | |
| 2015/0319718 A1* | 11/2015 | Yang | .................. | H04W 76/15 370/252 |
| 2015/0327180 A1* | 11/2015 | Ryu | .................. | H04L 1/00 370/329 |
| 2015/0327188 A1* | 11/2015 | Bagheri | .............. | H04W 52/383 455/426.1 |
| 2016/0029239 A1* | 1/2016 | Sadeghi | .............. | H04W 52/244 370/252 |
| 2016/0057758 A1* | 2/2016 | Ouchi | .............. | H04W 72/0446 370/280 |
| 2016/0219509 A1* | 7/2016 | Fujishiro | .............. | H04W 52/34 |
| 2017/0086176 A1* | 3/2017 | Seo | .................. | H04L 1/00 |
| 2017/0188316 A1* | 6/2017 | Seo | .................. | H04W 52/367 |

OTHER PUBLICATIONS

International Search Report dated Mar. 27, 2015, for corresponding International Application No. PCT/CN2014/083529, 2 pages.
LG Electronics, "Operational procedure in Mode 1 for D2D communication," R1-142150, 3GPP TSG RAN WG1 Meeting #77, Agenda Item: 6.2.5.2.2, Seoul, Korea, May 19-23, 2014, 3 pages.

* cited by examiner

100

200

| TPC Command Field | $\delta_{PUSCH}$ [dB] |
|---|---|
| 0 | −1 |
| 1 | 0 |
| 2 | 1 |
| 3 | 3 |

FIG. 7A

| TPC Command Field | $\delta_{D2D}$ [dB] |
|---|---|
| 0 | $-1-\beta$ |
| 1 | $0-\beta$ |
| 2 | $1-\beta$ |
| 3 | $3-\beta$ |

FIG. 7B

| TPC Command Field | $\delta_{D2D}$ [dB] |
|---|---|
| 0 | −1 |
| 1 | 0 |
| 2 | 1 |
| 3 | 3−$\gamma$ |

FIG. 8

| TPC Command Field | $\delta_{D2D}$ [dB] |
|---|---|
| 0 | −1−$\gamma$ |
| 1 | 0 |
| 2 | 1 |
| 3 | 3 |

FIG. 9

| TPC Command Field | $\delta_{PUSCH}$ [dB] |
|---|---|
| 0 | -4 |
| 1 | -1 |
| 2 | 1 |
| 3 | 4 |

FIG. 10A

| TPC Command Field | $\delta_{D2D}$ [dB] |
|---|---|
| 0 | $-4-\beta$ |
| 1 | $-1-\beta$ |
| 2 | $1-\beta$ |
| 3 | $4-\beta$ |

FIG. 10B

| TPC Command Field | $\delta_{D2D}$ [dB] |
|---|---|
| 0 | $-4-\gamma$ |
| 1 | $-1$ |
| 2 | 1 |
| 3 | 4 |

FIG. 11

| TPC Command Field | $\delta_{D2D}$ [dB] |
|---|---|
| 0 | $-4$ |
| 1 | $-1$ |
| 2 | 1 |
| 3 | $4-\gamma$ |

FIG. 12

| TPC Command Field | $\delta_{msg2}$ [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

FIG. 13A

| TPC Command Field | $\delta_{D2D}$ [dB] |
|---|---|
| 0 | $-6-\beta$ |
| 1 | $-4-\beta$ |
| 2 | $-2-\beta$ |
| 3 | $0-\beta$ |
| 4 | $2-\beta$ |
| 5 | $4-\beta$ |
| 6 | $6-\beta$ |
| 7 | $8-\beta$ |

FIG. 13B

| TPC Command Field | $\delta_{D2D}$ [dB] |
|---|---|
| 0 | $-6-\gamma$ |
| 1 | $-4-\gamma$ |
| 2 | $-2$ |
| 3 | 0 |
| 4 | 2 |
| 5 | 4 |
| 6 | 6 |
| 7 | 8 |

FIG. 14

| TPC Command Field | $\delta_{D2D}$ [dB] |
|---|---|
| 0 | $-6$ |
| 1 | $-4$ |
| 2 | $-2$ |
| 3 | 0 |
| 4 | 2 |
| 5 | 4 |
| 6 | $6-\gamma$ |
| 7 | $8-\gamma$ |

FIG. 15

TERMINAL, BASE STATION, TRANSMISSION POWER CONTROL METHOD, AND TRANSMISSION POWER SETTING METHOD

TECHNICAL FIELD

The present disclosure relates to a terminal, a base station, a transmission power control method, and a transmission power setting method.

BACKGROUND ART

[Direct Device-to-Device Communication Under Control of Base Station]

In LTE-Advanced, which is an evolved version of the 3rd Generation Partnership Project Radio Access Network Long Term Evolution (hereinafter, referred to as "LTE"), studies have been carried out on techniques that improve the power efficiency by performing direct communication between terminals capable of connecting to a cellular system (such terminals being sometimes called "user equipment" (UE)) (i.e., D2D (Device-to-Device) communication) (e.g., see, Non-Patent Literature (hereinafter, referred to as "NPL") 1). With the techniques, controlling D2D communication via a base station (may be referred to as "eNB") within the coverage area of the base station makes it possible to improve the power efficiency for transmission and reception of signals associated with D2D communication while avoiding interference to an existing cellular system.

FIG. 1 illustrates an overview of the D2D communication control procedure disclosed in NPL 1, for example. FIG. 1 illustrates an expected environment where a transmitter terminal (D2D Tx UE) and a receiver terminal (D2D Rx UE) performing D2D communication controlled by a base station (eNB) within the coverage area of the base station are present.

In FIG. 1, the eNB allocates some of the resources managed by the base station (eNB) (hereinafter, the resources managed by the base station are referred to as "WAN resource") for D2D communication. More specifically, the eNB allocates resources for D2D communication data (i.e., D2D data) as Data pool as well as for Scheduling Assignment (SA), which indicates D2D data assignment, as SA pool. In addition, the eNB previously indicates information on Data pool and SA pool (i.e., higher-layer resource pool configuration) to D2D Tx UE and D2D Rx UE (indication to D2D Rx UE is not illustrated in FIG. 1) using broadcast information or radio resource control (RRC) signaling.

Next, the eNB indicates a transmission grant (D2D grant) for D2D data and SA to D2D Tx UE using a downlink control signal intended for D2D Tx UE (e.g., Physical Downlink Control Channel (PDCCH)). Note that, the instruction contents indicated by D2D grant include information on D2D Rx UE and information on the time and frequency resources used for D2D data and SA, information on MCS (Modulation and Coding Scheme) to be applied, or frequency hopping information, for example. D2D Tx UE monitors a downlink control signal, and when detecting a D2D grant, transmits SA to the D2D Rx UE in accordance with the instruction contents indicated by the D2D grant. In addition, the D2D Tx UE transmits D2D data to the D2D Rx UE in accordance with the instruction contents indicated by the D2D grant.

Meanwhile, when detecting the SA intended for the D2D Rx UE while monitoring SA, the D2D Rx UE detects and demodulates the D2D data in accordance with the instruction contents indicated by the detected SA.

[Transmission Power Control for Uplink Signal Intended for Base Station]

In the LTE system that supports only terminals each provided with a single antenna in a logical point of view, transmission power $P_{PUSCH}(i)$ for the uplink data signal (Physical Uplink Shared Channel (PUSCH)) in the i-th subframe is obtained according to Equation 1 below (e.g., see NPL 2).

(Equation 1)

$$P_{PUSCH}(i) = \min\left\{\begin{array}{l}P_{CMAX}(i), \\ 10\log_{10}(M_{PUSCH}(i)) + P_{O\_PUSCH}(j) + \alpha(j) \cdot PL + \Delta_{TF}(i) + f(i)\end{array}\right\} \quad [1]$$

In Equation 1: "$P_{cmax}$"[dBm] represents the maximum transmission power for the terminal; "$M_{PUSCH}(i)$" represents the number of PUSCH frequency resource blocks allocated in the i-th subframe; "PL" represents the level [dB] of pathloss (PL) measured by the terminal; and "$P_{O\_PUSCH}(j)$"[dBm] and "$\alpha(j)$" represent the initial value of transmission power for PUSCH and the weighting coefficient indicating the pathloss compensation ratio, respectively, and are parameters individually configured by the base station in accordance with the types of semi-static assignment (j=0) and dynamic assignment (j=1). Moreover, "$\Delta_{TF}(i)$" represents an offset value that can be set in accordance with the control information amount in transmission of control information on PUSCH. In addition, "f(i)" represents a TPC (Transmission Power Control) adjustment state. In closed-loop control, "f(i)" represents an accumulated value in the i-th subframe including the previous values of the TPC command (e.g., +3 dB, +1 dB, 0 dB, −1 dB).

CITATION LIST

Non-Patent Literature

NPL 1
3GPP TSG RAN WG1 meeting #77, R1-142150, LG Electronics, "Operational procedure in Mode 1 for D2D communication," May 2014

NPL 2
3GPP TS36.213 v8.8.0 (section 5.1), "3GPP TSG RAN E-UTRA Physical layer procedures (Release 8)," September 2009

SUMMARY OF INVENTION

Technical Problem

In the D2D communication under the control of base station described above, it is likely that the D2D transmitter terminal not only transmits a signal intended for the D2D receiver terminal (D2D data) but also an uplink data signal (PUSCH) intended for the base station at the same time. However, sufficient studies have not been carried out yet on the transmission power control for signals intended for D2D communication in terminals that handle the transmission power control for signals intended for the base station and signals intended for D2D communication at the same time.

An aspect of this disclosure aims to provide a terminal, a base station, a transmission power control method, and a transmission power setting method that enable an appropriate transmission power control for both a signal intended for a base station and a signal intended for D2D communication in a terminal that performs D2D communication.

Solution to Problem

A terminal according to an aspect of the present disclosure includes: a reception processing section that receives a control signal including a TPC (transmission power control) command selected from among a plurality of candidate values; and a transmission control section that controls a first transmission power for an uplink data signal intended for a base station, using a first correction value corresponding to the received TPC command, and that controls a second transmission power for a signal for direct device-to-device communication using the first correction value or using a second correction value corresponding to the received TPC command, in which: the first correction value and the second correction value are set for each of the candidate values of the TPC command; and the second correction value is set lower than the first correction value for at least one of the candidate values.

A base station according to an aspect of the present disclosure includes: a configuration section that selects a TPC (transmission power control) command from among a plurality of candidate values corresponding to a first correction value for transmission power used in transmission power control for an uplink data signal intended for a base station or a signal for direct device-to-device communication or corresponding to a second correction value for transmission power used in transmission power control for the signal for direct device-to-device communication; and a transmission processing section that transmits a control signal including the TPC command, in which: the first correction value and the second correction value are set for each of the candidate values of the TPC command; and the second correction value is set lower than the first correction value for at least one of the candidate values.

A transmission power control method according to an aspect of the present disclosure includes: receiving a control signal including a TPC (transmission power control) command selected from among a plurality of candidate values; and controlling a first transmission power for an uplink data signal intended for a base station, using a first correction value corresponding to the received TPC command, and controlling a second transmission power for a signal for direct device-to-device communication using the first correction value or a second correction value corresponding to the received TPC command, in which: the first correction value and the second correction value are set for each of the candidate values of the TPC command; and the second correction value is set lower than the first correction value for at least one of the candidate values.

A transmission power configuration method according to an aspect of the present disclosure includes: selecting a TPC (transmission power control) command from among a plurality of candidate values corresponding to a first correction value for transmission power used in transmission power control for an uplink data signal intended for a base station or a signal for direct device-to-device communication or corresponding to a second correction value for transmission power used in transmission power control for the signal for direct device-to-device communication; and transmitting a control signal including the TPC command, in which: the first correction value and the second correction value are set for each of the candidate values of the TPC command; and the second correction value is set lower than the first correction value for at least one of the candidate values.

Advantageous Effects of Invention

According to an aspect of the present disclosure, it is possible to perform an appropriate transmission power control for both a signal intended for a base station and a signal intended for D2D communication in a terminal that performs D2D communication.

BRIEF DESCRIPTION OF DRAWINGS

FIGS. 7A and 7B are diagrams illustrating TPC commands according to Embodiment 1 of the present disclosure;

FIG. 8 is a diagram illustrating an example of a TPC command according to Variation A of Embodiment 1 of the present disclosure;

FIG. 9 is a diagram illustrating another example of the TPC command according to Variation A of Embodiment 1 of the present disclosure;

FIGS. 10A and 10B are diagrams illustrating an example of TPC commands according to Variation B of Embodiment 1 of the present disclosure;

FIG. 11 is a diagram illustrating another example of the TPC command according to Variation B of Embodiment 1 of the present disclosure;

FIG. 12 is a diagram illustrating still another example of the TPC command according to Variation B of Embodiment 1 of the present disclosure;

FIGS. 13A and 13B are diagrams illustrating an example of TPC commands according to Variation B of Embodiment 1 of the present disclosure;

FIG. 14 is a diagram illustrating yet another example of the TPC command according to Variation B of Embodiment 1 of the present disclosure; and FIG. 15 is a diagram illustrating yet another example of the TPC command according to Variation B of Embodiment 1 of the present disclosure.

DESCRIPTION OF EMBODIMENTS

Figure 1:
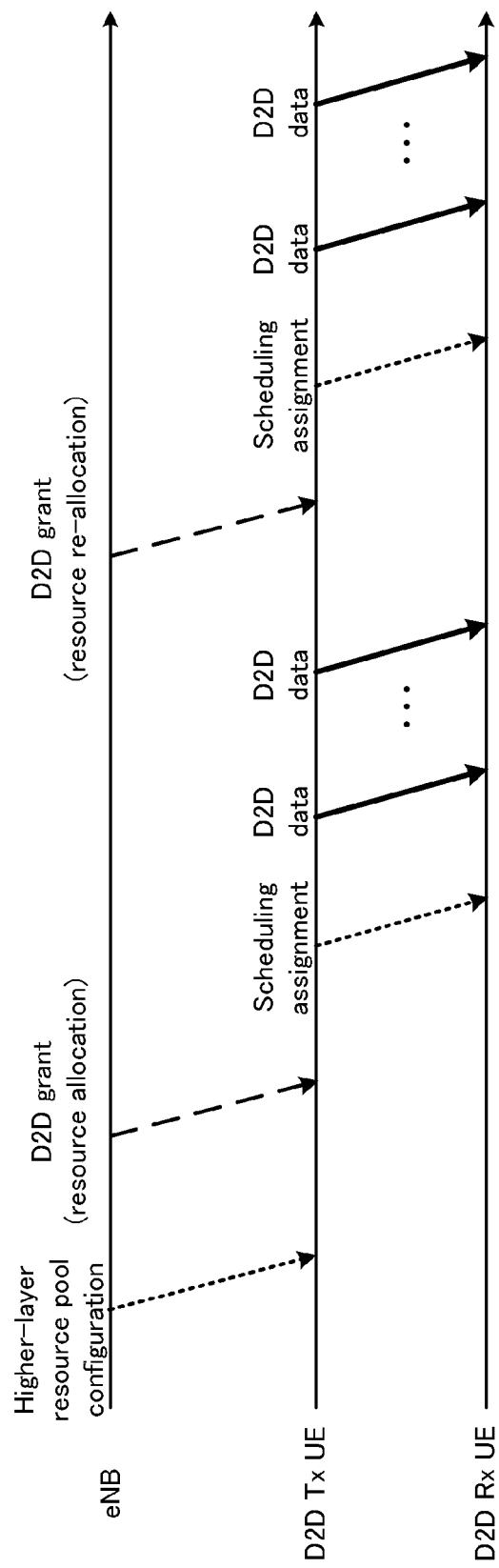
FIG. 1 is a diagram illustrating the operation of D2D communication under the control of a base station.

Hereinafter, a detailed description will be given of each embodiment of the present disclosure with reference to the drawings. Throughout the embodiments, the same elements are assigned the same reference numerals and any duplicate description of the elements will be omitted.

Embodiment 1

[Overview of Communication System]

The communication system according to Embodiment 1 includes base station 100 and terminals 200. Base station 100 is a base station that supports the LTE-Advanced system, and terminals 200 are terminals that support D2D communication in the LTE-Advanced system. More specifically, terminals 200 can each operate as a D2D Tx UE or D2D Rx UE.

Figure 2:
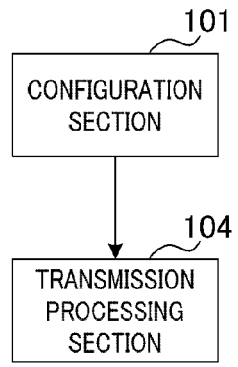
FIG. 2 is a block diagram illustrating a primary configuration of a base station according to Embodiment 1 of the present disclosure.

FIG. 2 is a primary configuration diagram of base station 100 according to Embodiment 1. In base station 100, configuration section 101 selects a TPC command from among a plurality of candidate values corresponding to a first correction value for transmission power used in transmission power control for an uplink data signal intended for base station 100 or a signal for D2D communication or corresponding to a second correction value for transmission power used in transmission power control for the signal for D2D communication. Transmission processing section 104 transmits a control signal (UL grant or D2D grant) including the TPC command.

Figure 3:
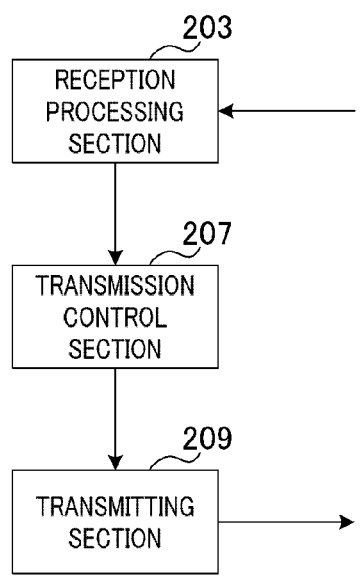
FIG. 3 is a block diagram illustrating a primary configuration of a terminal according to Embodiment 1 of the present disclosure.

FIG. 3 is a primary configuration diagram of terminal 200 according to Embodiment 1. In terminal 200, reception processing section 203 receives a control signal (UL grant or D2D grant) including the TPC command selected from among the plurality of candidate values. Transmission control section 207 controls the first transmission power for an uplink data signal intended for base station 100, using the first correction value corresponding to the received TPC command and controls the second transmission power for a D2D communication signal using the first correction value or the second correction value corresponding to the received TPC command.

The first correction value and the second correction value are set for each of the candidate values of the TPC command. In addition, the second correction value is set lower than the first correction value for at least one of the candidate values.

[Configuration of Base Station 100]

Figure 4:
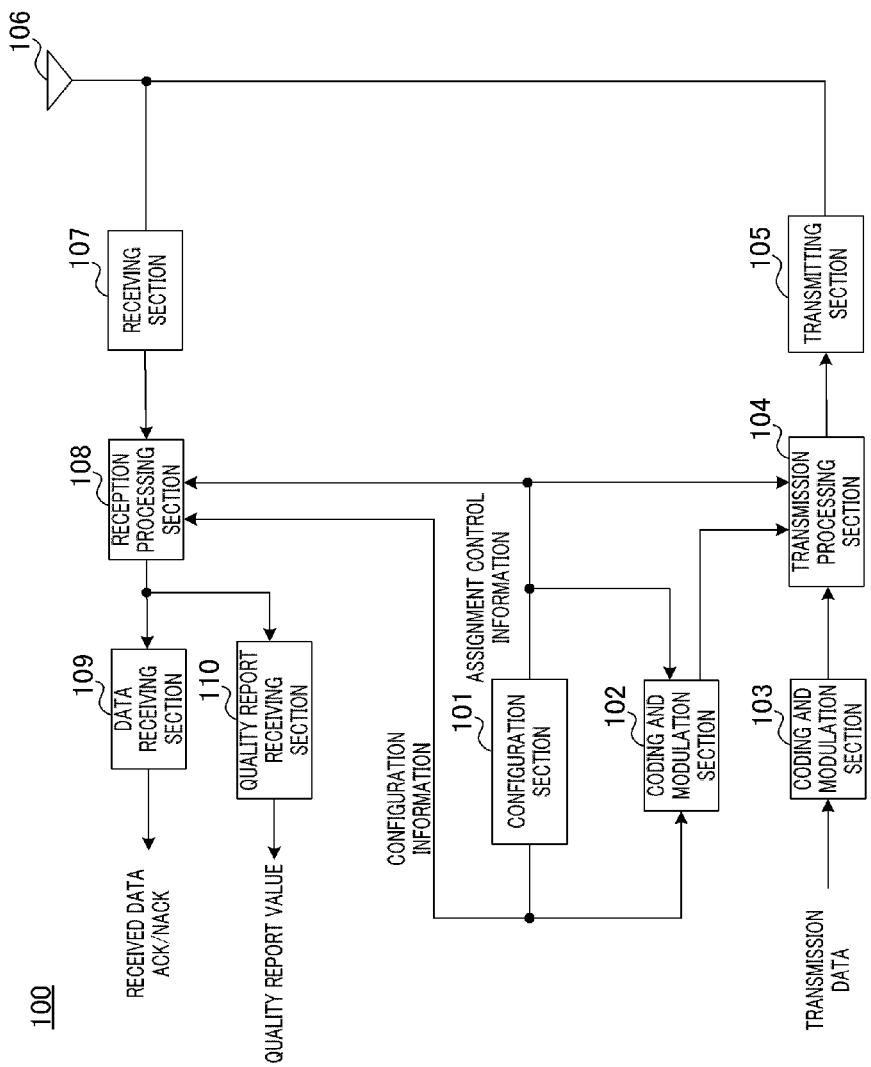
FIG. 4 is a block diagram illustrating a configuration of the base station according to Embodiment 1 of the present disclosure.

FIG. 4 is a block diagram illustrating a configuration of base station 100 according to Embodiment 1. In FIG. 4, base station 100 includes configuration section 101, coding and modulation sections 102 and 103, transmission processing section 104, transmitting section 105, antenna 106, receiving section 107, reception processing section 108, data receiving section 109, and quality report receiving section 110.

Configuration section 101 generates information on D2D communication for D2D communication target terminals 200. The information on D2D communication includes D2D configuration information indicating resources allocatable for D2D communication (i.e., Data pool and SA pool), for example. The D2D configuration information generated by configuration section 101 is subjected to transmission processing by coding and modulation section 102, transmission processing section 104, and transmitting section 105, and thereafter, the processed information is transmitted to D2D communication target terminal 200 as the control information (configuration information). As a configuration example of the control information that indicates D2D configuration information, system information (system information block) or radio resource control information (RRC signaling) can be used.

Moreover, configuration section 101 generates D2D grant information on a transmission grant (D2D grant) for D2D data and SA for a D2D transmitter terminal among D2D communication target terminals 200. The D2D grant information includes a TPC command for D2D communication (correction value for transmission power), information on a D2D receiver terminal or a group of D2D receiver terminals, information on the time and frequency resources used for D2D data and SA, information on the modulation and coding scheme (MCS) to be applied, or frequency hopping information (whether to be applied) or the like. For example, configuration section 101 selects a TPC command for D2D communication from among a plurality of candidate values based on a quality report (to be described hereinafter) to be reported from terminal 200. The D2D grant information generated by configuration section 101 is transmitted to D2D communication target terminals 200 as the control information (configuration information) after being subjected to the transmission processing by coding and modulation section 102, transmission processing section 104, and transmitting section 105.

Configuration section 101 generates, for terminal 200, UL grant information on the transmission grant (UL grant) for an uplink data signal (PUSCH) intended for base station 100. The UL grant information includes a TPC command for the uplink data signal (PUSCH), an uplink resource to which the uplink data signal is assigned, and MCS to be applied, or the like, for example. The UL grant information generated by configuration section 101 is outputted to reception processing section 108 and indicated to terminal 200 by base station 100 through coding and modulation section 102 as the control information (assignment control information).

In the manner described above, the control signal including TPC commands used in transmission power control for the transmission power for PUSCH and the transmission power for D2D data (D2D grant information and UL grant information) are transmitted. Note that, as a configuration example of the control information indicating the D2D grant information and UL grant information, a downlink control signal (Physical Downlink Control Channel (PDCCH)) can be used.

In addition, configuration section 101 generates downlink resource assignment information on a downlink resource to which a downlink data signal (Physical Downlink Shared Channel (PDSCH)) is assigned. The downlink resource assignment information is outputted to transmission processing section 104 and indicated to terminal 200 by base station 100 via coding and modulation section 102 as the control information (assignment control information). Moreover, configuration section 101 generates configuration information indicating a subframe in which a reference signal is transmitted. This configuration information is indicated to terminal 200 from base station 100 via coding and modulation section 102.

Coding and modulation section 102 encodes and modulates the information received from configuration section 101 and outputs the modulation signal thus obtained to transmission processing section 104.

Coding and modulation section 103 encodes and modulates a data signal (i.e., transmission data) received as input and transmits the modulation signal thus obtained to transmission processing section 104.

Transmission processing section 104 forms a transmission signal by mapping the modulation signals received from coding and modulation sections 102 and 103 to the resources indicated by the downlink resource assignment control information received from configuration section 101. During this process, when the transmission signal is an OFDM (Orthogonal Frequency Division Multiplexing) signal, transmission processing section 104 forms an OFDM signal by mapping the modulation signals to the resources indicated by the downlink resource assignment control information received from configuration section 101, then applying inverse fast Fourier transform (IFFT) processing to the mapped signal to transform the signal into a time wave form signal, and adding a cyclic prefix (CP) to the resultant signal.

Transmitting section 105 performs radio transmission processing (e.g., up-conversion, digital to analog (D/A) conversion and/or the like) on the transmission signal received from transmission processing section 104 and transmits the resultant signal via antenna 106.

Receiving section 107 performs radio reception processing (e.g., down-conversion, analog to digital (A/D) conversion and/or the like) on the radio signal received via antenna 106 and outputs the received signal thus obtained to reception processing section 108.

Reception processing section 108 identifies the resources to which the uplink data signal and ACK/NACK information are mapped, on the basis of the uplink resource assignment control information received from configuration section 101 and extracts a signal component mapped to the identified resources from the received signal. In addition, reception processing section 108 extracts a quality report of D2D communication target terminal 200 from the received signal. Note that, the quality report includes a reference signal received power (RSRP), a reference signal received quality (RSRQ), or a transmission power permitted value (Power Headroom (PHR)), or timing control information or the like, for example.

In addition, when the received signal is an OFDM signal, reception processing section 108 performs inverse discrete Fourier transform (IDFT) processing on the extracted signal component to transform the OFDM signal into a time-domain signal.

The uplink data signal (received data) and ACK/NACK information extracted by reception processing section 108 in the manner described above are outputted to data receiving section 109 while the quality report is outputted to quality report receiving section 110.

Data receiving section 109 decodes the signal received from reception processing section 108. The uplink data and ACK/NACK information are thus obtained.

Quality report receiving section 110 outputs the signal received from reception processing section 108 to another component section (not illustrated). Base station 100 selects D2D communication target terminal 200 or selects an MCS to be applied, for example, based on the received quality report of each D2D communication target terminal 200.

[Configuration of Terminal 200]

Figure 5:
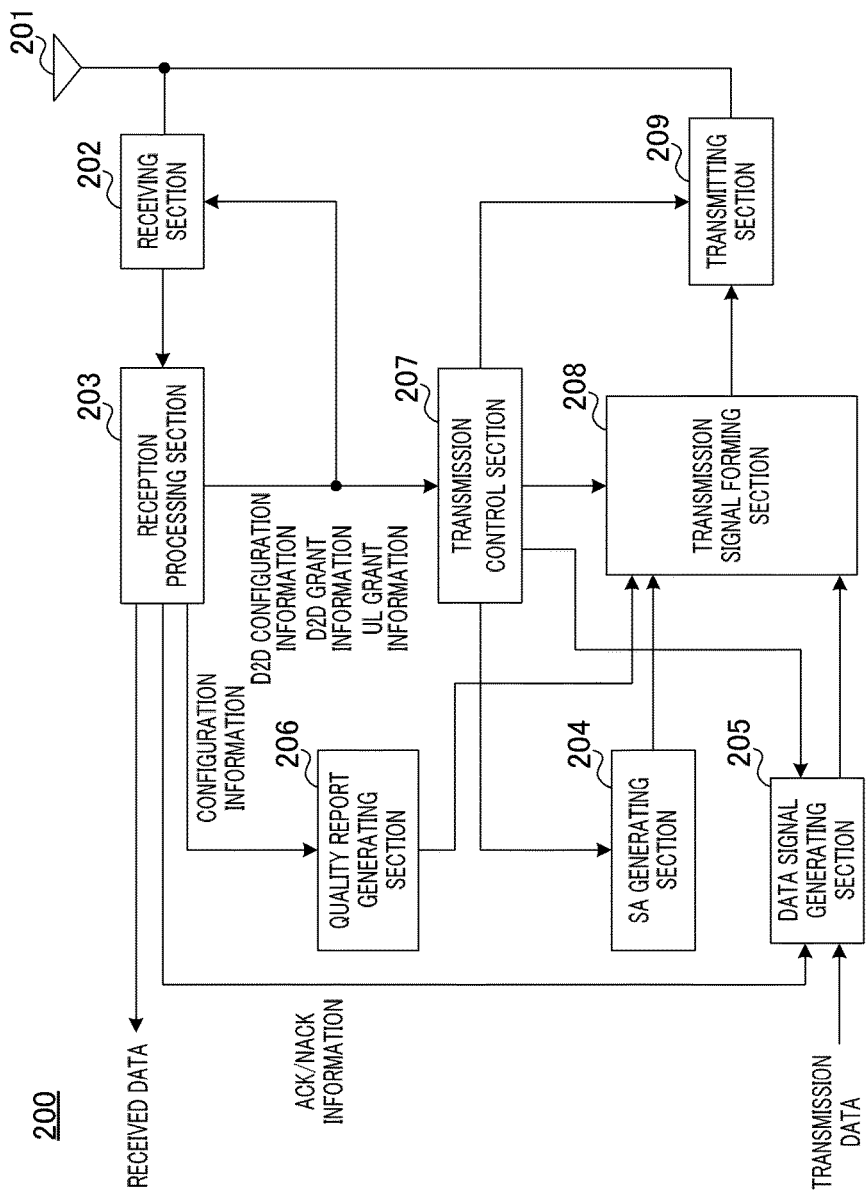
FIG. 5 is a block diagram illustrating a configuration of the terminal according to Embodiment 1 of the present disclosure.

FIG. 5 is a block diagram illustrating the configuration of terminal 200 according to Embodiment 1. Hereinafter, a description will be given of the configuration of D2D transmitter terminal 200 (D2D Tx UE) first.

In FIG. 5, terminal 200 includes antenna 201, receiving section 202, reception processing section 203, SA generating section 204, data signal generating section 205, quality report generating section 206, transmission control section 207, transmission signal forming section 208, and transmitting section 209.

Receiving section 202 performs radio reception processing (e.g., down-conversion, analog to digital (A/D) conversion and/or the like) on the radio signal received via antenna 201 and outputs the received signal thus obtained to reception processing section 203.

Reception processing section 203 extracts the control information and data signal included in the received signal.

Reception processing section 203 outputs D2D configuration information (Data pool, SA pool) to transmission control section 207 and receiving section 202, outputs D2D grant information and UL grant information to transmission control section 207, and outputs configuration information to quality report generating section 206 from the control information.

Moreover, reception processing section 203 performs error detection processing on the downlink data signal (PDSCH) extracted in accordance with the downlink resource assignment information included in the control information and outputs ACK/NACK information in accordance with the result of error detection to data signal generating section 205. Reception processing section 203 extracts a downlink data signal without any error as the received signal.

In addition, reception processing section 203 extracts configuration information indicating the subframe in which a reference signal is transmitted from the control information indicated separately and outputs the configuration information to quality report generating section 206.

Reception processing section 203 performs CP removal processing and FFT processing when the received signal is an OFDM signal.

Upon reception of an instruction to generate SA from transmission control section 207, SA generating section 204 generates an SA signal by encoding and modulating the information on the SA to be indicated to the D2D receiver terminal in the D2D grant information and outputs the SA signal to transmission signal forming section 208. Note that, SA generating section 204 may generate an SA signal for a D2D receiver terminal group formed of a plurality of D2D receiver terminals.

Upon reception of an instruction to generate a transmission signal intended for base station 100 from transmission control section 207, data signal generating section 205 uses the ACK/NACK information and transmission data as input and generates an uplink data signal (PUSCH) by encoding and modulating the ACK/NACK information and transmission data based on the MCS information received from transmission control section 207.

Upon reception of an instruction to generate a transmission signal intended for a D2D receiver terminal from transmission control section 207, data signal generating section 205 generates D2D data by encoding and modulating the transmission data based on the MCS information received from transmission control section 207.

Quality report generating section 206 monitors a reference signal based on the configuration information received from reception processing section 203 and generates a quality report using the reference signal. For example, quality report generating section 206 generates a quality report using a received signal power (e.g., RSRP) and/or a received quality (e.g., RSRQ), or the timing control information, or the transmission power permitted value (PHR) received from transmission signal forming section 208. Quality report generating section 206 outputs the quality report thus generated to transmission signal forming section 208.

Transmission control section 207 outputs the instruction to generate a transmission signal intended for base station 100 to data signal generating section 205, based on the UL grant information received from reception processing section 203. This instruction includes the assignment resources and MCS for the transmission signal (PUSCH) intended for base station 100.

In addition, transmission control section 207 outputs the instruction to generate an SA to SA generating section 204 and outputs the instruction to generate a transmission signal intended for the D2D receiver terminal to data signal generating section 205, based on the D2D grant information received from reception processing section 203.

Furthermore, transmission control section 207 identifies "mapping resources" to which the uplink data signal (PUSCH), D2D data, and SA signal are mapped, based on the UL grant information or D2D grant information received from reception processing section 203 and outputs information on the mapping resources (hereinafter, may be referred to as "mapping resource information") to transmission signal forming section 208.

In addition, transmission control section 207 controls the transmission power for the uplink data signal and the transmission power for the D2D data and SA signal using the TPC commands included in the UL grant information and D2D grant information, respectively. Transmission control section 207 outputs an instruction to control transmission power for the uplink data signal or D2D communication signal to transmitting section 209. Note that, the method of controlling transmission power in transmission control section 207 will be described hereinafter in detail.

Transmission signal forming section 208 maps the SA signal received from SA generating section 204 to the SA signal mapping resource. Transmission signal forming section 208 maps the data signal received from data signal generating section 205 (PUSCH signal or D2D data) to the corresponding mapping resource. Moreover, transmission signal forming section 208 maps the quality report received from quality report generating section 206 to the quality report mapping resource. The transmission signal is thus formed in the manner described above. When the transmission signal is an OFDM signal, transmission signal forming section 208 applies DFT (discrete Fourier transform) processing to the data signal first and then maps the resultant signal to the mapping resource. In addition, a CP is added to the transmission signal thus formed.

Transmitting section 209 performs radio transmission processing (e.g., up-conversion, digital to analog (D/A) conversion and/or the like) on the transmission signal formed by transmission signal forming section 208 and thereafter transmits the processed signal via antenna 201. During this process, transmitting section 209 transmits the transmission signal using the transmission power indicated by transmission control section 207.

Next, a description will be given of a configuration of the D2D receiver terminal (D2D Rx UE) with respect to differences between the D2D receiver terminal and D2D transmitter terminal with reference to the configuration of terminal 200 illustrated in FIG. 5.

In D2D receiver terminal 200, receiving section 202 extracts a resource component to which the SA signal is mapped from the received signal using the D2D configuration information.

Reception processing section 203 monitors a signal component received from receiving section 202 and detects the SA signal intended for D2D receiver terminal 200. Upon detection of the SA signal intended for D2D receiver terminal 200, reception processing section 203 detects and demodulates the D2D data in accordance with the contents of the SA signal. The demodulated D2D data is extracted as the received data. Note that, although the description has been given of the operation in which terminal 200 detects an SA signal intended for terminal 200, it is also possible to generate an SA signal intended for a D2D receiver terminal group formed of a plurality of D2D receiver terminals including terminal 200 without being limited to the operation mentioned above.

[Operation of Base Station 100 and Terminal 200]

A description will be given of the operation of base station 100 and terminal 200 each configured in the manner described above.

In base station 100, configuration section 101 configures D2D communication target terminal 200 with a transmission power control value applied to the transmission signal intended for base station 100 (i.e., PUSCH), and a transmission power control value applied to the SA signal and D2D data for D2D communication.

For example, transmission power $P_{PUSCH}(i)$ for PUSCH in the i-th subframe is obtained according to Equation 1. In addition, transmission power $P_{D2D}(i)$ for the SA signal and D2D data in the i-th subframe is obtained according to Equation 2 below.

(Equation 2)

$$P_{D2D}(i) = \min\begin{Bmatrix} P_{CMAX(i)}, \\ 10\log_{10}(M_{D2D}(i)) + P_{O\_D2D}(j) + \alpha_{D2D}(j) \cdot PL + \Delta_{TF\_D2D}(i) + f_{D2D}(i) \end{Bmatrix} \quad [2]$$

In Equation 2: "$P_{cmax}$"[dBm] represents the maximum transmission power for terminal 200; "$M_{D2D}(i)$" represents the number of frequency resource blocks allocated for the transmission signal for D2D communication in the i-th subframe; "PL" represents the level[dB] of pathloss measured by terminal 200; and "$P_{O\_D2D}(j)$"[dBm] and "$\alpha_{D2D}(j)$" represent the initial value of transmission power for the transmission signal for D2D communication, and the weighting coefficient indicating the pathloss (PL) compensation ratio, respectively, and are parameters individually configured by base station 100 in accordance with the types of semi-static assignment (j=0) and dynamic assignment (j=1). Moreover, "$\Delta_{TF\_D2D}(i)$" represents an offset value that can be set in accordance with the control information amount in transmission of control information on the transmission signal for D2D communication. In addition, "$f_{D2D}(i)$" represents a TPC adjustment state for D2D communication.

Common values may be set for pathloss "PL," the initial values of transmission power "$P_{O\_PUSCH}$," "$P_{O\_D2D}$," and weighting coefficients "$\alpha$" and "$\alpha_{D2D}$" in Equations 1 and 2. More specifically, the pathloss corresponding to the distance between base station 100 and D2D transmitter terminal is set as "PL" indicated in Equations 1 and 2. In addition, the values identical to those set for "$P_{O\_PUSCH}$" and "$\alpha$" used in calculation of the transmission power for PUSCH in Equation 1 are set for "$P_{O\_D2D}$" and "$\alpha_{D2D}$" in Equation 2.

Stated differently, the communication environment between base station 100 and D2D communication terminals are taken into consideration in calculation of the transmission power for D2D communication. Thus, it is possible to avoid a situation where a signal from a D2D transmitter terminal is transmitted using a power exceeding the pathloss "PL" between base station 100 and the D2D transmitter terminal when base station 100 receives an uplink data signal (PUSCH) or an uplink control signal (PUCCH) from a terminal other than the D2D transmitter terminal. Accordingly, it is possible to avoid a situation where the signal from the D2D transmitter terminal causes excessive interference to a signal from another terminal in base station 100. Moreover, it is possible for the D2D receiver terminal to avoid interference from the uplink signal intended for base station 100 transmitted from another terminal (interference signal) to the signal transmitted from the D2D transmitter terminal (desired signal).

Figure 6:
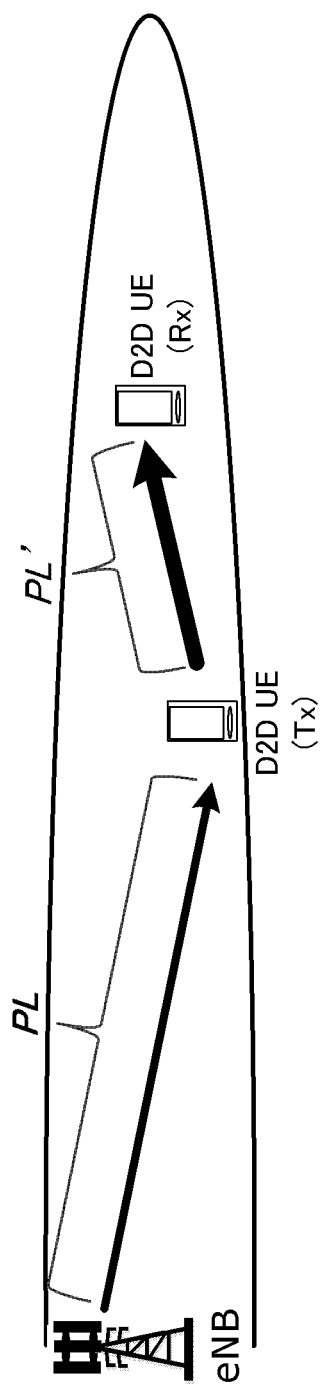
FIG. 6 is a diagram illustrating pathloss in D2D communication under the control of a base station.

Meanwhile, as illustrated in FIG. 6, the environment where D2D communication is applied is likely to be an environment where a D2D transmitter terminal distant from base station 100 (eNB), and a D2D receiver terminal located near the D2D transmitter terminal communicate with each other. In this environment, normally, pathloss PL' between the D2D transmitter terminal and D2D receiver terminal may be compensated for by the transmission power control for D2D communication. In this embodiment, however, the pathloss PL between base station 100 and the D2D transmitter terminal is used in the transmission power control for D2D communication indicated in Equation 2 as described above. For this reason, there is a possibility that a power efficiency improvement effect to be obtained from application of D2D communication may not be obtained because a large transmission power corresponding to PL is set even when the distance between the D2D communication terminals are short (PL'<PL) in the transmission power control for D2D communication indicated in Equation 2.

For this reason, in Embodiment 1, the correction value for the transmission power corresponding to the TPC command for D2D communication indicated by D2D grant is made different from the correction value for the transmission power corresponding to the TPC command for PUSCH indicated by UL grant. More specifically, the power reduction amount by the TPC command for D2D communication is set larger than the power reduction amount by the TPC command for PUSCH. Thus, the transmission power control for D2D communication can achieve convergence to an optimum transmission power value faster than the transmission power control for PUSCH.

More specifically, accumulated value "$f_{PUSCH}(i)$" of the TPC adjustment state for PUSCH indicated in Equation 1 (corresponding to f(i) indicated in Equation 1) is updated according to Equation 3 below.

[3]

$$f_{PUSCH}(i)=f_{PUSCH}(i-1)+\delta_{PUSCH}(i-K_{PUSCH})$$ (Equation 3)

In Equation 3, "$\delta_{PUSCH}(i-K_{PUSCH})$" represents the correction value [dB] of transmission power corresponding to the TPC command indicated $K_{PUSCH}$ subframe(s) before the i-th subframe. More specifically, "$K_{PUSCH}$" indicates the timing at which the TPC command for PUSCH is indicated (i.e., subframe).

For example, as illustrated in FIG. 7A, the values in the TPC command field represented by two bits (may be referred to as "code point") are associated with different values of $\delta_{PUSCH}$, respectively. In FIG. 7A, $\delta_{PUSCH}=-1$, 0, 1, and 3 are set for candidate values 0, 1, 2, and 3 (00, 01, 10, and 11) of the TPC command, respectively.

Meanwhile, accumulated value "$f_{D2D}(i)$" of the TPC adjustment state for D2D communication indicated in Equation 2 is updated according to Equation 4 below.

[4]

$$f_{D2D}(i)=f_{D2D}(i-1)+\delta_{D2D}(i-K)$$ (Equation 4)

In Equation 4, "$\delta_{D2D}(i-K)$" represents the correction value [dB] for the transmission power corresponding to the TPC command indicated K subframe(s) before the i-th subframe. Stated differently, "K" indicates the timing at which the TPC command for D2D communication is indicated (i.e., subframe).

For example, in FIG. 7B, $\delta_{D2D}=-1-\beta$, $0-\beta$, $1-\beta$, and $3-\beta$ are set for candidate values of 0, 1, 2, and 3 (00, 01, 10, and 11) for the two-bit TPC command, respectively. The term "$\beta$" in FIG. 7B is a predetermined value (positive integer) separately set for the D2D transmitter terminal.

In comparison between "$\delta_{PUSCH}$" in FIG. 7A and "$\delta_{D2D}$" in FIG. 7B, "$\delta_{D2D}$" is smaller than "$\delta_{PUSCH}$" in each candidate value of the TPC command. More specifically, each "$\delta_{D2D}$" takes a value smaller than corresponding "$\delta_{PUSCH}$" by the amount of "$\beta$." More specifically, the transmission power control for D2D communication can reduce the transmission power value fast as compared with the transmission power control for PUSCH.

For example, in FIG. 7B, when $\beta=2$, $\delta_{D2D}=1$ for TPC command=3, and an increase in the power is indicated. Meanwhile, when $\delta_{D2D}=-3$ dB for TPC command=0, a power reduction using a larger value that cannot be taken in "$\delta_{PUSCH}$" (lowest value: −1 dB) can be indicated. Moreover, in FIG. 7B, when a value equal to or greater than 4 is set for "0" (i.e., a value larger than the largest value (3 dB) of "$\delta_{PUSCH}$" in FIG. 7A), all the values of "$\delta_{D2D}$" for the TPC command are less than 0, for example. More specifically, it is possible to indicate a reduction of transmission power for D2D communication using all the values of TPC command.

Note that, higher layer signaling such as radio resource control information (RRC signaling) or MAC signaling may be used as the control signal to indicate "$\beta$," for example.

As described above, base station 100 selects a TPC command from among a plurality of candidate values corresponding to correction values "$\delta_{PUSCH}$" or correction values "$\delta_{D2D}$" based on a quality report from terminal 200. Meanwhile, terminal 200 controls the transmission power for an uplink data signal intended for the base station using the correction value "$\delta_{PUSCH}$" corresponding to the received TPC command during communication with base station 100, and controls the transmission power for a D2D communication signal using the correction value "$\delta_{D2D}$" corresponding to the received TPC command during D2D communication.

In the transmission power control described above, the correction value "$\delta_{D2D}$" indicated by the TPC command used in transmission power control for D2D communication and the correction value "$\delta_{PUSCH}$" indicated by the TPC command used in transmission power control for PUSCH communication are made different from each other to make the power reduction amount for D2D communication greater than the power reduction amount for PUSCH transmission. More specifically, the correction value "$\delta_{D2D}$" used in transmission power control for D2D communication is set lower than the correction value "$\delta_{PUSCH}$" used in transmission power control for PUSCH. As a result, in the transmission power control for D2D communication, the power reduction amount by single TPC command indication can be large compared to the transmission power control for PUSCH.

For example, as illustrated in FIG. 1, it is likely that a plurality of D2D data sets are collectively assigned by single D2D grant (resource allocation) for D2D communication. More specifically, it is likely that resource allocation is less frequently performed during D2D communication than during communication between base station 100 and terminal 200 such as PUSCH. Meanwhile, according to Embodiment 1, making the power reduction amount by single D2D grant indication large as compared to the transmission power control for PUSCH enables the transmission power control that achieves faster convergence to an appropriate transmission power.

Moreover, as in the case of TPC command for PUSCH (2 bits), a design that allows the TPC command for D2D communication to be indicated by a limited number of bits may be required. In this respect, in Embodiment 1, as illustrated in FIGS. 7A and 7B, the TPC command for D2D communication is set using the same number of bits as that used for the TPC command for PUSCH (2 bits), and also, the correction values for transmission power corresponding to the same candidate values of the TPC commands are set lower for D2D communication than for PUSCH. As a result, a design that allows a larger power reduction amount to be indicated by a limited number of bits is made possible without reducing the flexibility of transmission power control for D2D communication, which is the same level as the transmission power control for PUSCH.

As has been described above, in Embodiment 1, it is possible to set a lower transmission power value faster in D2D communication while the same transmission power control mechanism as that for PUSCH communication intended for base station 100 is applied to D2D communication.

As described above, in Embodiment 1, the TPC command for D2D communication is indicated by D2D grant, which is different from UL grant. For this reason, the transmission power control for D2D communication can be performed without any influence on the transmission power control for transmission signals intended for base station 100.

Thus, according to Embodiment 1, it is possible to perform an appropriate transmission power control for both a signal intended for base station 100 and a signal intended for D2D communication in terminal 200 that performs D2D communication.

Variation A of Embodiment 1

In Embodiment 1, a description has been given of the case where the offset value "0" for "$\delta_{PUSCH}$" for PUSCH transmission is applied to all the candidate values (0 to 3) of the TPC command as illustrated in FIG. 7B. However, "$\delta_{D2D}$" may be set lower than "$\delta_{PUSCH}$" for at least one of the plurality of candidate values of the TPC command. Accordingly, the offset value for "$\delta_{PUSCH}$" for PUSCH transmission is applied to only some of the plurality of candidate values of the TPC command for D2D communication in Variation A.

For example, while the indication of power reduction is required frequently during D2D communication, a situation to drastically increase power barely occurs during D2D communication. Taking this into consideration, for "$\delta_{D2D}$" in FIG. 8, offset "γ" is applied when TPC command=3, which corresponds to the largest value among the values of "$\delta_{PUSCH}$" in FIG. 7A. The term "γ" in FIG. 8 is a predetermined value separately indicated to the D2D transmitter terminal (positive integer). Thus, instead of using $\delta_{D2D}$=3, which is expected to be barely indicated in D2D communication, $\delta_{D2D}$=3−γ (value less than 3) can be used. Accordingly, the transmission power control for D2D communication can be performed more flexibly.

In addition, as another example, for "$\delta_{D2D}$" in FIG. 9, offset "γ" may be applied when TPC command=0 ($\delta_{PUSCH}$<0) indicating a power reduction among the values of "$\delta_{PUSCH}$" in FIG. 7A. In addition, for "$\delta_{D2D}$" in FIG. 9, it can be said that offset "γ" is applied to the case where TPC command=0, which corresponds to the smallest value among the values of "$\delta_{PUSCH}$" in FIG. 7A. Accordingly, when reducing the transmission power in transmission power control for D2D communication, the power reduction amount by single TPC command indication can be made larger.

More specifically, in Variation A, "$\delta_{D2D}$" is set equal to or lower than "$\delta_{PUSCH}$" in each of the candidate values of the TPC command, and "$\delta_{D2D}$" is set lower than "$\delta_{PUSCH}$" for at least one of the candidate values.

Note that, although a description has been given of the case where offset "γ" is applied only to one of the candidate values of the TPC command in FIGS. 8 and 9, the variation is not limited to this case, and offset "γ" may be applied to two or more of the candidate values. For example, offset "γ" may be applied to the TPC command corresponding to the largest power increase amount (largest correction value) and the TPC command corresponding to the largest power reduction amount (smallest correction value) among the four values of the TPC command represented by two bits.

Variation B of Embodiment 1

In Embodiment 1, a description has been given of the case where an accumulation-type closed loop control (see, Equations 3 and 4) is performed. In Variation B, however, a description will be given of a case where a closed loop control indicating an absolute value instead of an accumulated value is performed.

More specifically, indication value "$f_{PUSCH}(i)$" (corresponding to "f(i)" in Equation 1) of the TPC adjustment state for PUSCH in Equation 1 is set according to Equation 5 below.

[5]

$$f_{PUSCH}(i)=\delta_{PUSCH}(i-K_{PUSCH})$$ (Equation 5)

As indicated in FIG. 10A, for example, "$\delta_{PUSCH}$"=−4, −1, 1, and 4 are set for the candidate values 0, 1, 2, and 3 (00, 01, 10, and 11) of the TPC command, respectively.

Meanwhile, indication value "$f_{D2D}(i)$" of the TPC adjustment state for D2D communication in Equation 2 is updated according to Equation 6 below.

[6]

$$f_{D2D}(i)=\delta_{D2D}(i-K)$$ (Equation 6)

As indicated in FIG. 10B, for example, "$\delta_{PUSCH}$"=−4-β, −1-β, 1-β, and 4-β are set for the candidate values 0, 1, 2, and 3 (00, 01, 10, and 11) for the TPC command, respectively. The term "β" indicated in FIG. 10A is a predetermined value (positive integer) separately indicated to the D2D transmitter terminal.

In comparison between "$\delta_{PUSCH}$" in FIG. 10A and "$\delta_{D2D}$" in FIG. 10B, "$\delta_{D2D}$" takes a value lower than "$\delta_{PUSCH}$" by the amount of "0" in each of the candidate values of the TPC command. More specifically, the transmission power control for D2D communication can reduce the transmission power value faster than the transmission power control for PUSCH.

In the manner described above, even when the transmission power control indicating the correction values for transmission power using an absolute value is applied, the transmission power control that achieves faster convergence to an appropriate transmission power is made possible while the same transmission power control mechanism as that for PUSCH communication intended for base station 100 is applied in the transmission power control for D2D communication, as in the case of Embodiment 1.

Note that, as in Variation A, the offset value for "$\delta_{PUSCH}$" for PUSCH transmission may be applied to only some of the plurality of candidate values of the TPC command for D2D communication. For example, FIG. 11 illustrates an example where offset "γ" is applied to the case where TPC command=0, which corresponds to the largest power reduction amount among the four values of the TPC command represented by two bits. FIG. 12 illustrates an example where the offset "γ" is applied to the case where TPC command=3, which corresponds to the largest power increase amount among the four values of the TPC command represented by two bits.

Moreover, in the three-bit TPC command used in the random access procedure illustrated in FIG. 13A, offset "β" may be applied in the manner illustrated in FIG. 13B for replacement as the TPC command used in transmission power control for D2D communication. In addition, as in Variation A, offset "γ" for "$\delta_{mgs2}$" may be applied to some values of the TPC command as illustrated in FIGS. 14 and 15.

Embodiment 2

The configurations of base station and terminals according to Embodiment 2 will be described with reference to FIG. 4 (base station 100) and FIG. 5 (terminal 200) because they are basically the same as those according to according to Embodiment 1.

In Embodiment 2, a description will be given of a case where the situations in which the instruction contents of the TPC command in D2D communication are made different from the instruction contents of the TPC command in PUSCH transmission are specified. Stated differently, terminal 200 changes the interpretation of the TPC command indicated by base station 100 in accordance with the situations during transmission power control for D2D communication.

Hereinafter, Cases 1 to 3 will be described as the situations that are the bases for determining the instruction contents of the TPC command for D2D communication.

<Case 1>

As described in Embodiment 1, the pathloss "PL" between the D2D transmitter terminal and base station 100 is used as a parameter of transmission power control for D2D communication indicated in Equation 2.

Accordingly, as illustrated in FIG. 6, for example, when the D2D transmitter terminal and D2D receiver terminal are distant from base station 100 (e.g., when the terminals are located near the cell edge), the pathloss PL used in transmission power control in Equation 2 is larger than actual pathloss PL' between the terminals. In this case, the transmission power set by Equation 2 is likely to be a transmission power larger than the optimum transmission power required for the actual D2D communication.

Meanwhile, when the D2D transmitter terminal and D2D receiver terminal are located near base station 100, the difference between pathloss PL used in transmission power control in Equation 2 and actual pathloss PL' between the terminals is small. For this reason, the transmission power set by Equation 2 is likely to be a value close to the optimum transmission power required for the actual D2D communication.

More specifically, the situation where transmission power control that reduces the transmission power occurs more often when D2D communication terminals 200 are distant from base station 100 than when D2D communication terminals 200 are located near base station 100.

Accordingly, in Case 1, base station 100 and terminals 200 identify whether the terminals that perform D2D communication are close to each other by comparing the distance between the D2D communication terminals and base station 100. When identifying that the terminals that perform D2D communication are close to each other, base station 100 and terminals 200 perform transmission power control using the association of the TPC command in which a correction value for a larger power reduction amount is set.

For example, base station 100 and terminals 200 changes the interpretation of the correction value for transmission power corresponding to the set TPC command according to whether or not the timing control value included in D2D grant (e.g., Timing Advance value (TA value)) exceeds a predetermined value.

The timing control value included in D2D grant is a value for adjusting the transmission timing of the D2D transmitter terminal (reception timing of the D2D receiver terminal). For example, a larger value is set for the timing control value when the D2D communication terminals and base station 100 are more distant from each other. In addition, when the timing control value is larger, the D2D transmitter terminal transmits a signal intended for the D2D receiver terminal at an earlier timing. As a result, the reception timing of the D2D receiver terminal can be matched (adjusted) to the timing serving as the basis.

More specifically, base station 100 (quality report receiving section 110) receives a quality report from D2D communication target terminals 200 (i.e., D2D transmitter terminal and D2D receiver terminal) first. Subsequently, base station 100 (configuration section 101) sets the timing control value to be indicated and includes the value in D2D grant, using the information on the timing control of the D2D receiver terminal, which is included in the quality report.

Base station 100 (configuration section 101) sets the instruction contents of the TPC command for D2D communication in accordance with the set timing control value. More specifically, base station 100 sets the TPC command for D2D communication, using the TPC command in which a correction value for a larger power reduction amount is set (e.g., FIG. 7B), when the timing control value exceeds a predetermined value. Meanwhile, base station 100 (configuration section 101) sets the TPC command for D2D communication, using the TPC command in which a correction value similar to that for PUSCH transmission is set, when the timing control value is not greater than the predetermined value. Base station 100 thus indicates the determined TPC command to the D2D transmitter terminal.

Likewise, D2D transmitter terminal 200 identifies the TPC command corresponding to the indication bits of the indicated TPC command, using the association of the TPC command in which a correction value for a larger power reduction amount is set (e.g., FIG. 7B), when the timing control value indicated by the detected D2D grant exceeds a predetermined value. D2D transmitter terminal 200 identifies the TPC command corresponding to the indication bits of the indicated TPC command, using the association of the TPC command in which a correction value similar to that for PUSCH transmission is set (e.g., FIG. 7A), when the timing control value indicated by the detected D2D grant is not greater than the predetermined value. Terminal 200 transmits the SA signal and D2D data with the transmission power controlled by using the identified TPC command.

Note that, the predetermined value serving as the basis for determination is separately indicated to terminal 200 by base station 100 via a control signal, for example.

When the timing control value exceeds a predetermined value as described above, i.e., when the D2D communication terminals are distant from base station 100, the association of the TPC command involving a larger power reduction amount than the association of the TPC command for PUSCH is used.

<Case 2>

In Case 2, base station 100 and terminals 200 change the interpretation of the instruction contents of the TPC command in accordance with a resource assignment information value included in D2D grant.

The information indicating whether or not frequency hopping is applied is one of the resource assignment information pieces. For example, in the D2D communication environment where no frequency hopping is set is considered as an environment where transmission of a low robustness signal is applicable. In other words, it can be said that frequency hopping is determined to be unnecessary in such a D2D communication environment. Accordingly, for example, it can be said that the situation where no frequency hopping is set is a situation where the D2D transmitter terminal and D2D receiver terminal are located close to each other and where communication with a low transmission power is possible.

In this respect, in Case 2, base station 100 and terminals 200 identify whether or not the D2D transmitter terminal and D2D receiver terminal are located close to each other according to whether or not frequency hopping is applied, and determines whether or not to reduce the transmission power value in D2D communication faster.

More specifically, base station 100 sets the TPC command for D2D communication, using the TPC command for which a correction value for a larger power reduction amount is set (e.g., FIG. 7B), when the information included in D2D grant and indicating whether or not frequency hopping is applied indicates that no frequency hopping is applied. Meanwhile, base station 100 sets the TPC command for D2D communication, using the TPC command for which a correction value similar to that for PUSCH transmission is set (e.g., FIG. 7A), when the information indicates that frequency hopping is applied. Base station 100 thus indicates the determined TPC command to the D2D transmitter terminal.

Likewise, D2D transmitter terminal 200 identifies the TPC command corresponding to the indication bits of the indicated TPC command, using the association of the TPC command in which a correction value for a larger power reduction amount is set (e.g., FIG. 7B), when the information indicated by the detected D2D grant and indicating whether or not frequency hopping is applied indicates that no frequency hopping is applied. Meanwhile, D2D transmitter terminal 200 identifies the TPC command corresponding to the indication bits of the indicated TPC command, using the association of the TPC command in which a correction value similar to that for PUSCH transmission is set (e.g., FIG. 7A), when the information indicates that frequency hopping is applied. Terminal 200 transmits the SA signal and D2D data with the transmission power controlled by using the identified TPC command.

As described above, when no frequency hopping is applied, i.e., when the D2D communication terminals are located close to each other, the association of the TPC command involving a larger power reduction amount than the association of the TPC command for PUSCH is used.

Note that, instead of whether or not frequency hopping is applied, the presence or absence of repetition transmission of a signal may be used. More specifically, it may be determined to use the association of the TPC command in which a correction value for a larger power reduction amount is set (e.g., FIG. 7B), when information indicating the number of times of repetition transmission for a signal (repetition factor) indicates that no repetition transmission is applied or that the number of times of repetition transmission is not greater than a predetermined value. Meanwhile, it may be determined to use the association of the TPC command in which a correction value similar to that for PUSCH transmission is set (e.g., FIG. 7A), when repetition transmission is applied or the number of times of repetition transmission exceeds the predetermined value.

The fewer the number of times of repetition transmission, the more likely the D2D communication environment will be considered as an environment where transmission of a low robustness signal is applicable. Stated differently, it can be said that the situation where the number of times of repetition transmission is few is a situation where the D2D transmitter terminal and D2D receiver terminal are located close to each other and where communication using a low transmission power is possible as in the situation where no frequency hopping is applied.

<Case 3>

In Case 3, base station 100 and terminals 200 change the interpretation of the instruction contents of the TPC command in accordance with an MCS value included in D2D grant.

A higher MCS value corresponds to a combination of coding rate and a modulation scheme that enables higher frequency utilization efficiency. For example, an MCS that corresponds to higher frequency utilization efficiency is selected for an environment having a better communication quality. Meanwhile, the shorter the distance between the D2D transmitter terminal and D2D receiver terminal, the better the communication quality will be, so that a higher MCS value is set. Stated differently, it can be said that the situation where a high MCS value is set is a situation where the D2D transmitter terminal and D2D receiver terminal are located close to each other and where communication using a low transmission power is possible.

In this respect, in Case 3, base station 100 and terminals 200 identify whether or not the D2D transmitter terminal and D2D receiver terminal are located close to each other according to the MCS value and determine whether or not to reduce the transmission power value for D2D communication faster.

More specifically, base station 100 sets the TPC command for D2D communication, using the TPC command for which a correction value for a larger power reduction amount is set (e.g., FIG. 7B), when the MCS value included in D2D grant exceeds a predetermined value. Meanwhile, base station 100 sets the TPC command for D2D communication, using the TPC command for which a correction value similar to that for PUSCH transmission is set (e.g., FIG. 7A), when the MCS value included in D2D grant is not greater than the predetermined value. Base station 100 thus indicates the determined TPC command to the D2D transmitter terminal.

Likewise, D2D transmitter terminal 200 identifies the TPC command corresponding to the indication bits of the indicated TPC command, using the association of the TPC command in which a correction value for a larger power reduction amount is set (e.g., FIG. 7B), when the MCS value indicated by the detected D2D grant exceeds a predetermined value. D2D transmitter terminal 200 identifies the TPC command corresponding to the indication bits of the indicated TPC command, using the association of the TPC command in which a correction value similar to that for PUSCH transmission is set (e.g., FIG. 7A), when the MCS value is not greater than the predetermined value. Terminal 200 transmits the SA signal and D2D data with the transmission power controlled by using the identified TPC command.

Note that, the predetermined value serving as the basis for determination is separately indicated to terminal 200 by base station 100 via a control signal, for example.

As described above, when the MCS value exceeds the predetermined value, i.e., when the D2D communication terminals are located close to each other, the association of the TPC command involving a larger power reduction amount than the association of the TPC command for PUSCH is used.

Cases 1 to 3 have been described thus far. Note that, the associations of the TPC command to be used in Cases 1 to 3 are not limited to those illustrated in FIG. 7A or FIG. 7B, and any of the associations in FIG. 8 to FIG. 15 may be used.

As described above, correction value "$\delta_{PUSCH}$" is used in transmission power control for an uplink data signal intended for base station 100 or a D2D communication signal. In addition, correction value "$\delta_{D2D}$" is used in transmission power control for a D2D communication signal. More specifically, base station 100 selects a TPC command from among a plurality of candidate values corresponding to correction value "$\delta_{PUSCH}$" or correction value "$\delta_{D2D}$" based on the quality report from terminal 200. During this process, base station 100 determines to use any one of correction value "$\delta_{PUSCH}$" and correction value "$\delta_{D2D}$" in accordance with the situation of terminal 200.

Meanwhile, terminal 200 controls the transmission power for an uplink data signal intended for the base station, using correction value "$\delta_{PUSCH}$" corresponding to the received TPC command for communication with base station 100. In addition, terminal 200 controls the transmission power for a D2D communication signal, using correction value "$\delta_{PUSCH}$" or correction value "$\delta_{D2D}$" corresponding to the received TPC command during D2D communication. During this process, terminal 200 determines to use any one of correction value "$\delta_{PUSCH}$" and correction value "$\delta_{D2D}$" in accordance with the situation of terminal 200.

More specifically, base station 100 and terminal 200 perform transmission power control so as to achieve faster convergence to an appropriate transmission power, using the association of the TPC command involving a larger power reduction amount, only when the D2D communication terminals are located close to each other.

As a result, when the D2D communication terminals are located close to each other, setting a larger power reduction amount by single D2D grant indication enables a transmission power control that achieves faster convergence to an appropriate transmission power (low transmission power). Meanwhile, when the D2D communication terminals are not located close to each other (i.e., when no fast reduction of transmission power is required), the use of a correction value for transmission power similar to that for PUSCH enables an appropriate transmission power control.

Each embodiment according to the present disclosure has been described thus far.

Other Embodiments

In each of the embodiments described above, a description has been given of the case where the TPC command for D2D communication and the TPC command for PUSCH are indicated by D2D grant and UL grant, respectively, and the correction values ("$\delta_{PUSCH}$" and "$\delta_{D2D}$") for transmission power in accordance with the TPC commands are individually indicated (e.g., see FIGS. 7A and 7B). However, the TPC command for D2D communication and the TPC command for PUSCH may be indicated by using a single common indication bit and the interpretation of the correction value for transmission power associated with the indication bit may be changed according to which one of PUSCH transmission and D2D communication the TPC command is applied in the D2D transmitter terminal.

In addition, in each of the embodiments described above, a description has been given of the case where initial value "$Po\_{\_D2D}$" and weighting coefficient "$\alpha_{D2D}$" of the transmission power for D2D communication take the same values as those of initial value "$Po\_{\_PUSCD}$" and weighting coefficient "$\alpha$" of the transmission power for PUSCH in Equations 1 and 2. However, initial value "$Po\_{\_D2D}$" and weighting coefficient "$\alpha_{D2D}$" of the transmission power for D2D communication may take values different from those of the transmission power for PUSCH.

In the each of the embodiments described above, an aspect of the present disclosure has been described using a hardware configuration by way of example, but the present disclosure can be implemented using a software configuration in concert with hardware.

In addition, the functional blocks used in the descriptions of the embodiments are typically implemented as LSI devices, which are integrated circuits. These functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal according to the present disclosure includes: a reception processing section that receives a control signal including a TPC (transmission power control) command selected from among a plurality of candidate values; and a transmission control section that controls a first transmission power for an uplink data signal intended for a base station, using a first correction value corresponding to the received TPC command, and that controls a second transmission power for a signal for direct device-to-device communication using the first correction value or using a second correction value corresponding to the received TPC command, in which: the first correction value and the second correction value are set for each of the candidate values of the TPC command; and the second correction value is set lower than the first correction value for at least one of the candidate values.

In the terminal according to the present disclosure, each of the second correction values is lower than a corresponding one of the first correction values by the amount of an offset value.

In the terminal according to the present disclosure, the offset value is indicated to the terminal via higher layer signaling.

In the terminal according to the present disclosure: the control signal further includes a timing control value for which a larger value is set when the base station and the terminal are more distant from each other; and the transmission control section controls the second transmission power using the second correction value in a case where the timing control value exceeds a predetermined value, and the transmission control section controls the second transmission power using the first correction value in a case where the timing control value is not greater than the predetermined value.

In the terminal according to the present disclosure: the control signal further includes information indicating whether or not frequency hopping is applied to the direct device-to-device communication; and the transmission control section controls the second transmission power using the second correction value in a case where frequency hopping is applied, and the transmission control section controls the second transmission power using the first correction value in a case where no frequency hopping is applied.

In the terminal according to the present disclosure: the control signal further includes an MCS (modulation and coding scheme) value in the direct device-to-device communication; and the transmission control section controls the second transmission power using the second correction value in a case where the MCS value exceeds a predetermined value, and the transmission control section controls the second transmission power using the first correction value in a case where the MCS value is not greater than the predetermined value.

A base station according to the present disclosure includes: a configuration section that selects a TPC (transmission power control) command from among a plurality of candidate values corresponding to a first correction value for transmission power used in transmission power control for an uplink data signal intended for a base station or a signal for direct device-to-device communication or corresponding to a second correction value for transmission power used in transmission power control for the signal for direct device-to-device communication; and a transmission processing section that transmits a control signal including the TPC command, in which: the first correction value and the second correction value are set for each of the candidate values of the TPC command; and the second correction value is set lower than the first correction value for at least one of the candidate values.

A transmission power control method according to the present disclosure includes: receiving a control signal including a TPC (transmission power control) command selected from among a plurality of candidate values; and controlling a first transmission power for an uplink data signal intended for a base station, using a first correction value corresponding to the received TPC command, and controlling a second transmission power for a signal for direct device-to-device communication using the first correction value or a second correction value corresponding to the received TPC command, in which: the first correction value and the second correction value are set for each of the candidate values of the TPC command; and the second correction value is set lower than the first correction value for at least one of the candidate values.

A transmission power configuration method according to the present disclosure includes: selecting a TPC (transmission power control) command from among a plurality of candidate values corresponding to a first correction value for transmission power used in transmission power control for an uplink data signal intended for a base station or a signal for direct device-to-device communication or corresponding to a second correction value for transmission power used in transmission power control for the signal for direct device-to-device communication; and transmitting a control signal including the TPC command, in which: the first correction value and the second correction value are set for each of the candidate values of the TPC command; and the second correction value is set lower than the first correction value for at least one of the candidate values.

INDUSTRIAL APPLICABILITY

An aspect of the present disclosure is useful in mobile communication systems, for example.

REFERENCE SIGNS LIST

100 Base station
101 Configuration section
102, 103 Coding and modulation section
104 Transmission processing section
105, 209 Transmitting section
106, 201 Antenna
107, 202 Receiving section
108, 203 Reception processing section
109 Data receiving section
110 Quality report receiving section
200 Terminal
204 SA generating section
205 Data signal generating section
206 Quality report generating section
207 Transmission control section
208 Transmission signal forming section

The invention claimed is:
1. A terminal comprising:
a receiver, which in operation, receives a control signal including a TPC (transmission power control) command selected from among a plurality of candidate values; and
circuitry, which in operation, controls a first transmission power for an uplink data signal for a base station, using a first correction value corresponding to the received TPC command, and controls a second transmission power for a signal for direct device-to-device communication using the first correction value or using a second correction value corresponding to the received TPC command, wherein:
the first correction value and the second correction value are set for each of the candidate values;
the second correction value is set lower than the first correction value for at least one of the candidate values;
the control signal further includes a timing control value for which a larger value is set when the base station and the terminal are more distant from each other; and the circuitry, in operation, controls the second transmission power using the second correction value in a case where the timing control value exceeds a predetermined value, and the circuitry, in operation, controls the second transmission power using the first correction value in a case where the timing control value is not greater than the predetermined value.

2. The terminal according to claim 1, wherein each of the second correction values is lower than a corresponding one of the first correction values by the amount of an offset value.

3. The terminal according to claim 2, wherein the offset value is indicated to the terminal via higher layer signaling.

4. A terminal comprising:
a receiver, which in operation, receives a control signal including a TPC (transmission power control) command selected from among a plurality of candidate values; and
circuitry, which in operation, controls a first transmission power for an uplink data signal for a base station, using a first correction value corresponding to the received TPC command, and controls a second transmission power for a signal for direct device-to-device communication using the first correction value or using a second correction value corresponding to the received TPC command, wherein:
the first correction value and the second correction value are set for each of the candidate values;
the second correction value is set lower than the first correction value for at least one of the candidate values;
the control signal further includes information indicating whether or not frequency hopping is applied to the direct device-to-device communication; and
the circuitry, in operation, controls the second transmission power using the second correction value in a case where frequency hopping is applied, and the circuitry, in operation, controls the second transmission power using the first correction value in a case where no frequency hopping is applied.

5. A base station comprising:
circuitry, which in operation, selects a TPC (transmission power control) command from among a plurality of candidate values, each of which corresponds to a first correction value or a second correction value, the first correction value being used for controlling a first transmission power for an uplink data signal for a base station or used for controlling a second transmission power for a signal for direct device-to-device communication and the second correction value being used for controlling the second transmission power; and
a transmitter, which in operation, transmits a control signal including the TPC command, wherein:
the first correction value and the second correction value are set for each of the candidate values;
the second correction value is set lower than the first correction value for at least one of the candidate values;
the control signal further includes a timing control value for which a larger value is set when the base station and a terminal are more distant from each other; and
the second correction value is used for controlling the second transmission power in a case where the timing control value exceeds a predetermined value, and the first correction value is used for controlling the second transmission power in a case where the timing control value is not greater than the predetermined value.

6. A transmission power control method comprising:
receiving a control signal including a TPC (transmission power control) command selected from among a plurality of candidate values; and
controlling a first transmission power for an uplink data signal for a base station, using a first correction value corresponding to the received TPC command, and controlling a second transmission power for a signal for direct device-to-device communication using the first correction value or a second correction value corresponding to the received TPC command, wherein:
the first correction value and the second correction value are set for each of the candidate values;
the second correction value is set lower than the first correction value for at least one of the candidate values;
the control signal further includes a timing control value for which a larger value is set when the base station and the terminal are more distant from each other; and
the second correction value is used for controlling the second transmission power in a case where the timing control value exceeds a predetermined value, and the first correction value is used for controlling the second transmission power in a case where the timing control value is not greater than the predetermined value.

7. A transmission power configuration method comprising:
selecting a TPC (transmission power control) command from among a plurality of candidate values, each of which corresponds to a first correction value or a second correction value, the first correction value being used for controlling transmission power for an uplink data signal for a base station or used for controlling transmission power for a signal for direct device-to-device communication and the second correction value being used for controlling transmission power for the signal for direct device-to-device communication; and
transmitting a control signal including the TPC command, wherein:
the first correction value and the second correction value are set for each of the candidate values;
the second correction value is set lower than the first correction value for at least one of the candidate values;
the control signal further includes a timing control value for which a larger value is set when the base station and a terminal are more distant from each other; and
the second correction value is used for controlling the second transmission power in a case where the timing control value exceeds a predetermined value, and the first correction value is used for controlling the second transmission power in a case where the timing control value is not greater than the predetermined value.

8. A base station comprising:
circuitry, which in operation, selects a TPC (transmission power control) command from among a plurality of candidate values, each of which corresponds to a first correction value or a second correction value, the first correction value being used for controlling a first transmission power for an uplink data signal for a base station or used for controlling a second transmission power for a signal for direct device-to-device communication and the second correction value being used for controlling the second transmission power; and
a transmitter, which in operation, transmits a control signal including the TPC command, wherein:
the first correction value and the second correction value are set for each of the candidate values;
the second correction value is set lower than the first correction value for at least one of the candidate values;

the control signal further includes information indicating whether or not frequency hopping is applied to the direct device-to-device communication; and the second correction value is used for controlling the second transmission power in a case where frequency hopping is applied, and the first correction value is used for controlling the second transmission power in a case where no frequency hopping is applied.

9. A transmission power control method comprising:

receiving a control signal including a TPC (transmission power control) command selected from among a plurality of candidate values; and controlling a first transmission power for an uplink data signal for a base station, using a first correction value corresponding to the received TPC command, and controlling a second transmission power for a signal for direct device-to-device communication using the first correction value or a second correction value corresponding to the received TPC command, wherein:

the first correction value and the second correction value are set for each of the candidate values;

the second correction value is set lower than the first correction value for at least one of the candidate values;

the control signal further includes information indicating whether or not frequency hopping is applied to the direct device-to-device communication; and the second correction value is used for controlling the second transmission power in a case where frequency hopping is applied, and the first correction value is used for controlling the second transmission power in a case where no frequency hopping is applied.

10. A transmission power configuration method comprising:

selecting a TPC (transmission power control) command from among a plurality of candidate values, each of which corresponds to a first correction value or a second correction value, the first correction value being used for controlling transmission power for an uplink data signal for a base station or used for controlling transmission power for a signal for direct device-to-device communication and the second correction value being used for controlling transmission power for the signal for direct device-to-device communication; and transmitting a control signal including the TPC command, wherein:

the first correction value and the second correction value are set for each of the candidate values;

the second correction value is set lower than the first correction value for at least one of the candidate values;

the control signal further includes information indicating whether or not frequency hopping is applied to the direct device-to-device communication; and the second correction value is used for controlling the second transmission power in a case where frequency hopping is applied, and the first correction value is used for controlling the second transmission power in a case where no frequency hopping is applied.

* * * * *